United States Patent [19]
Ichimaru

[11] Patent Number: 6,016,454
[45] Date of Patent: Jan. 18, 2000

[54] SUSPENSION CONTROL APPARATUS

[75] Inventor: Nobuyuki Ichimaru, Kanagawa-ken, Japan

[73] Assignee: Tockico Ltd., Kanagawa-ken, Japan

[21] Appl. No.: 08/910,224

[22] Filed: Aug. 13, 1997

[30] Foreign Application Priority Data

Sep. 20, 1996 [JP] Japan .................................. 8-271857

[51] Int. Cl.[7] ............................... G06F 7/76; G06G 7/70
[52] U.S. Cl. .............................. 701/37; 701/36; 701/38; 280/5.514; 280/5.515
[58] Field of Search ................................. 701/37, 36, 38; 361/152, 154, 160, 187; 280/5.515, 5.519, 124.102, 5.501, 5.511, 5.512, 5.513, 5.514, 6.157, 5.52, 5.518, 5.507; 324/546, 415; 251/129.05, 129.07, 30.02, 129.08, 129.16

[56] References Cited

U.S. PATENT DOCUMENTS

| | | | |
|---|---|---|---|
| 4,988,967 | 1/1991 | Miller et al. | 251/129.05 |
| 5,048,861 | 9/1991 | Takahashi | 280/5.501 |
| 5,106,053 | 4/1992 | Miller et al. | 251/129.05 |
| 5,113,158 | 5/1992 | Tsuji et al. | 318/599 |
| 5,202,813 | 4/1993 | Uota et al. | 361/154 |
| 5,400,245 | 3/1995 | Butsuen et al. | 701/37 |
| 5,619,413 | 4/1997 | Oakley | 701/37 |
| 5,625,269 | 4/1997 | Ikeda | 318/696 |
| 5,701,245 | 12/1997 | Ogawa et al. | 701/37 |
| 5,703,750 | 12/1997 | Kim et al. | 361/187 |
| 5,773,981 | 6/1998 | Sugiura et al. | 324/546 |
| 5,790,364 | 8/1998 | Mikami et al. | 361/154 |

FOREIGN PATENT DOCUMENTS

4423102 A1  1/1996  Germany.

*Primary Examiner*—Jacques H. Louis-Jacques
*Attorney, Agent, or Firm*—Wenderoth, Lind & Ponack, L.L.P.

[57] ABSTRACT

In the suspension control apparatus of the present invention, a CPU determines a desired damping force, based on an acceleration of a car body in a vertical direction, which is detected by an acceleration sensor, and also determines a PWM duty ratio corresponding to an intensity of a target current (an average intensity of the applied current) required for generating the desired damping force. Further, the CPU detects a voltage provided by a battery and adjusts the PWM duty ratio, based on the detected voltage value, so as to maintain a dither amplitude at a predetermined level. A PWM signal having the adjusted duty ratio is outputted to a transistor, to thereby apply a current which is obtained by superimposing a dither on the target current. By this arrangement, the dither amplitude can be maintained at a predetermined level, even when the voltage value changes, so that an undesirable increase in hysteresis with respect to a damping force can be avoided and pronounced noise and vibration of a proportional solenoid valve can be suppressed.

4 Claims, 9 Drawing Sheets

SUSPENSION CONTROL APPARATUS

BACKGROUND OF THE INVENTION

The present invention relates to a suspension control apparatus which can be advantageously used as a suspension control apparatus for an automobile.

As a conventional suspension control apparatus, there can be mentioned an apparatus comprising a proportional solenoid valve having a spool for controlling an amount of a hydraulic fluid passing therethrough according to a position of the spool, the spool being adapted to be displaced according to an intensity of current applied to a solenoid; a variable damping force generating shock absorber provided between a car body and an axle to generate a damping force which varies depending on the intensity of the current applied to the solenoid, that is, depending on the position of the spool; and an acceleration sensor for detecting an acceleration of the car body in a vertical direction. In this apparatus, the intensity of current to be applied to the solenoid is determined, based on the value detected by the acceleration sensor, to thereby generate a desired damping force (for an extension stroke and a compression stroke). Thus, damping of vibration of a sprung mass is effected, thereby improving the ride quality.

In the above-mentioned apparatus, the current to be applied to the solenoid is obtained by superimposing a high-frequency oscillating current (dithering current, which is hereinafter referred to simply as "dither"), which is obtained on the basis of a PWM (pulse width modulation) signal, on a fundamental current having a desired intensity (a desired current having an intensity equal to an average intensity of the current to be applied to the solenoid), which is determined from the value detected by the acceleration sensor. Therefore, the spool oscillates slightly (dithers) about a predetermined position, so that displacement of the spool can be easily performed, thereby improving responsivity in controlling a damping force. The above-mentioned current to be applied to the solenoid, which includes a dither is obtained, for example, in a manner as mentioned below.

Figure 9:
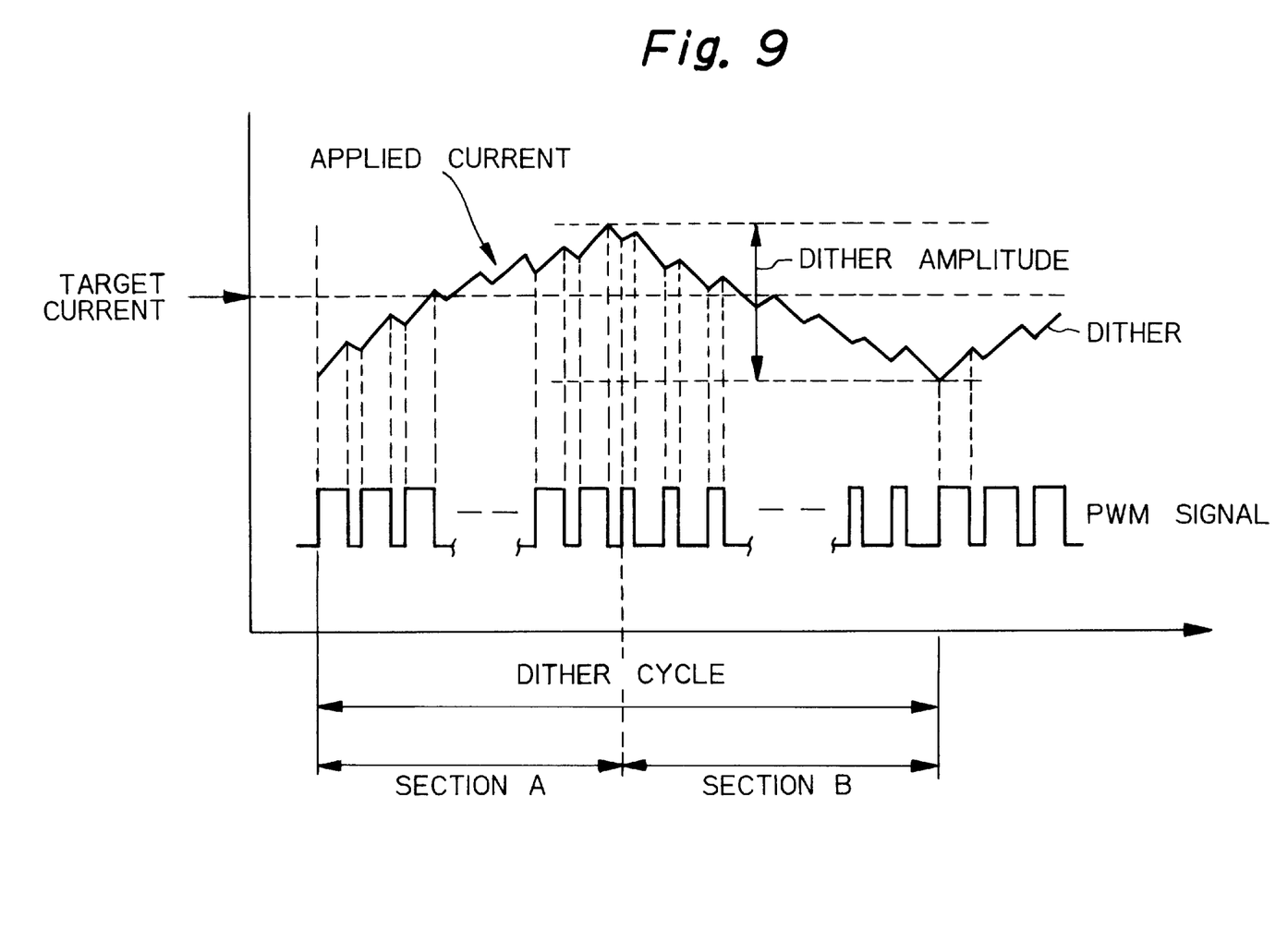
FIG. 9 is a graph showing a typical example of a waveform of a current including a dither, for explaining a relationship between a PWM signal and a dither.

A switching device (transistor) is provided between the solenoid and a power source. The switching device is adapted to be switched on and off in response to the PWM signal. Due to a transient phenomenon, when the PWM signal is of a high level [for example, when a duty ratio of the PWM signal is 75% (that is, when the transistor is switched on during a period of 75% of a cycle of the PWM signal and switched off during a period of 25% of a cycle of the PWM signal)], the current intensity applied to the solenoid gradually increases. Subsequently, when the PWM signal is of a low level [for example, the duty ratio of the PWM signal is 25% (that is, the transistor is switched on during a period of 25% of a cycle of the PWM signal and switched off during a period of 75% of a cycle of the PWM signal)], the current intensity applied to the solenoid gradually decreases. Illustratively stated, as shown in FIG. 9, when the duty ratio of the PWM signal is as high as, for example, 75% (section A), a rate of increase in current intensity applied to the solenoid (when the transistor is switched on during a period of 75% of a cycle of the PWM signal) is larger than a rate of decrease in current intensity applied to the solenoid (when the transistor is switched off during a period of 25% of a cycle of the PWM signal). Consequently, in section A, the current intensity applied to the solenoid increases at each cycle of the PWM signal. (Hereinafter, for the sake of convenience, the duty ratio when the intensity of current applied to the solenoid increases at each cycle of the PWM signal is referred to simply as "increase duty ratio"). On the other hand, when the duty ratio of the PWM signal is as low as, for example, 25% (section B), a rate of decrease in current intensity applied to the solenoid (when the transistor is switched off during a period of 75% of a cycle of the PWM signal) is larger than a rate of increase in current intensity applied to the solenoid (when the transistor is switched on during a period of 25% of a cycle of the PWM signal). Consequently, in section B, the intensity of current applied to the solenoid decreases at each cycle of the PWM signal. (Hereinafter, for the sake of convenience, the duty ratio of the PWM signal when the current intensity applied to the solenoid decreases at each cycle of the PWM signal is referred to simply as "decrease duty ratio"). The duty ratio is switched between the increase duty ratio and the decrease duty ratio at each predetermined duty-ratio-switching cycle (½ of a cycle of a dither). Thus, the current to be applied to the solenoid is obtained in such a form that a dither having a predetermined amplitude and a cycle time of twice the duty-ratio-switching period is superimposed on the fundamental current (desired current). Hereinafter, for the sake of convenience, the amplitude of the dither is frequently referred to simply as "dither amplitude", and the duty ratio of the PWM signal is frequently referred to simply as "PWM duty ratio".

In the above-mentioned conventional suspension control apparatus, it is desired to maintain the dither amplitude at a predetermined level. However, when the voltage impressed on the solenoid changes due to a temperature change or the like, the dither amplitude also changes, so that the dither amplitude may fall outside of the predetermined range (optimum amplitude range). When the dither amplitude exceeds the upper limit of the optimum amplitude range, the proportional solenoid valve generates pronounced noise and vibration. When the dither amplitude falls below the lower limit of the optimum amplitude range, displacement of the spool is difficult to perform, so that an undesirable increase in hysteresis with respect to the damping force occurs, leading to poor responsivity in controlling the damping force.

The meaning of "hysteresis with respect to the damping force" is as follows. Hysteresis with respect to the damping force describes a phenomenon whereby to obtain an equal change in damping force when increasing or decreasing a damping force, different intensities of current are required to be applied to the solenoid. Therefore, in a graph showing a damping force-current intensity relationship, in which the abscissa indicates the intensity of current and the ordinate indicates the damping force, a closed curve (hysteresis loop) substantially in the form of a parallelogram is obtained. It is preferred that the size of the hysteresis loop (a difference of an intensity of current required for increasing a damping force to obtain a predetermined amount of change in damping force from an intensity of current required for decreasing a damping force to obtain the same predetermined amount of change in damping force) be suppressed to as low a level as possible.

BRIEF SUMMARY OF THE INVENTION

In view of the above-mentioned situation, the present invention has been made. A primary object of the present invention is to provide a suspension control apparatus which is capable of suppressing an increase in hysteresis with respect to a damping force and preventing the proportional solenoid valve from generating pronounced noise and vibration, when the voltage impressed on the solenoid changes.

According to the present invention, there is provided a suspension control apparatus comprising:

a PWM signal generator operable to generate a PWM signal having a variable duty ratio;

a proportional solenoid valve having a solenoid and a movable member, the solenoid being connected to a power source through a switching device which is switched on and off in response to the PWM signal, the movable member being adapted to be displaced according to an intensity of current applied to the solenoid;

a variable damping force generating shock absorber provided between a vehicle body and an axle to generate a damping force which varies depending on a position of the movable member;

a voltage detector operable to detect a voltage impressed on the solenoid; and duty ratio adjuster operable to adjust the duty ratio of the PWM signal, wherein the current applied to the solenoid includes a dither which is obtained by changing the duty ratio of the PWM signal at predetermined time intervals and wherein the duty ratio adjuster is capable of adjusting the duty ratio, based on a voltage value detected by the voltage detector, to thereby maintain an amplitude of the dither at a predetermined level.

By use of the suspension control apparatus of the present invention in which the duty ratio adjuster is capable of adjusting the duty ratio of the PWM signal, based on the voltage value detected by the voltage detecting means, it has become possible to maintain the dither amplitude at a predetermined level.

The foregoing and other objects, features and advantages of the present invention will be apparent from the following detailed description and appended claim taken in connection with the accompanying drawings.

DETAILED DESCRIPTION OF THE INVENTION

Figure 1:
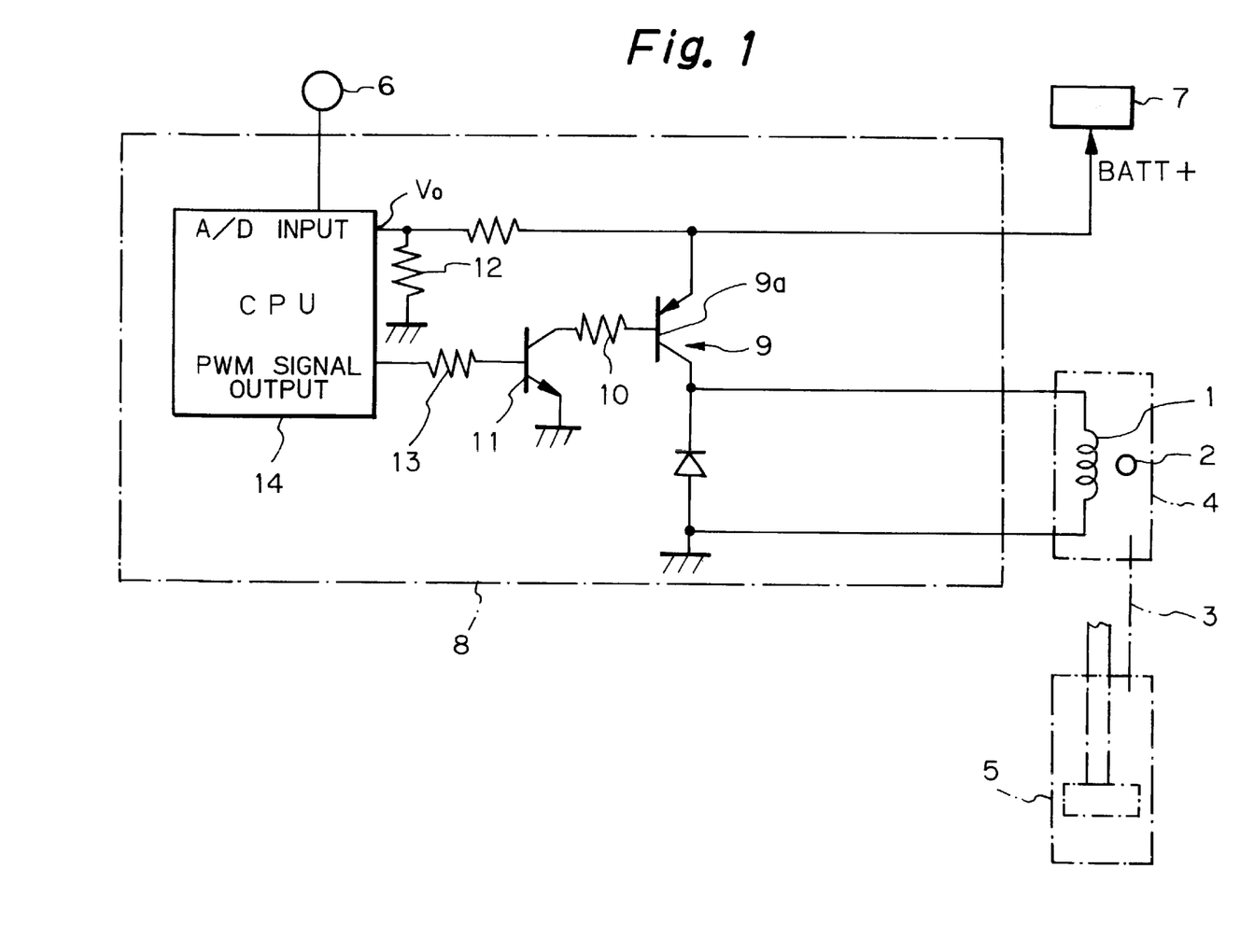
FIG. 1 is an illustration showing a typical example of a suspension control apparatus according to one embodiment of the present invention.

Hereinbelow, a suspension control apparatus according to one embodiment of the present invention is explained, with reference to FIGS. 1 to 6. As shown in FIG. 1, the suspension control apparatus mainly comprises: a proportional solenoid valve 4 having a solenoid 1 and a spool 2 for controlling an amount of a hydraulic fluid 3 passing therethrough according to a position of the spool 2, the spool 2 being adapted to be displaced according to an intensity of current applied to the solenoid 1; a variable damping force generating shock absorber 5 provided between a car body (not shown) and an axle (not shown) to generate a damping force which varies depending on the intensity of the current applied to the solenoid 1, that is, depending on the position of the spool 2; an acceleration sensor 6 for detecting an acceleration of the car body in a vertical direction; a battery (power source) 7 for applying the current to the solenoid 1; and a controller 8 provided between the battery 7 and the solenoid 1 to control the current applied to the solenoid 1.

The controller 8 comprises a transistor (switching device) 9 provided between the solenoid 1 and the battery 7; a transistor (switching device) 11 connected to a base 9a of the transistor 9 through a resistor 10; a resistor 12 having one end connected to the battery 7 and the other end grounded so as to represent a voltage $V_0$ provided by the battery 7; and a CPU 14 connected to the resistor 12 at one end thereof which is connected to the battery 7 so as to detect the voltage $V_0$ provided by the battery 7 and also connected to the transistor 11 through a resistor 13, and the acceleration sensor 6.

The CPU 14 has a memory (not shown) storing a PWM duty ratio—current intensity map shown in FIG. 2, which is explained below. The CPU 14 determines the duty ratio of the PWM signal, based on a value detected by the acceleration sensor 6 and then, corrects the determined duty ratio, based on the voltage $V_0$ provided by the battery 7 which is detected in a manner as mentioned above, in accordance with the PWM duty ratio—current intensity map of FIG. 2 (a method of correcting the PWM duty ratio is explained below in detail). The PWM signal having the corrected duty ratio is outputted to the transistor 11. The transistor 11 is switched on and off in response to the PWM signal, to thereby apply to the solenoid 1 a current (hereinafter, frequently referred to simply as "applied current") which is obtained by superimposing a dither on a fundamental current (a target current having an intensity equal to an average intensity of the applied current). With respect to correction of the PWM duty ratio, the PWM duty ratio is corrected so that the dither amplitude is maintained at a predetermined level. In this embodiment of the present invention, the CPU 14 comprises PWM signal generator, voltage detector and duty ratio corrector.

Hereinbelow, explanation is made with regard to a method of correcting the PWM duty ratio to maintain a dither amplitude at a predetermined level, with reference to FIGS. 2 and 3.

To generate a dither, the PWM duty ratio is switched between two different duty ratios (the above-mentioned increase duty ratio and decrease duty ratio) at predetermined time intervals. The increase duty ratio and the decrease duty ratio are, respectively, determined by adding a dither amplitude duty ratio to a reference duty ratio and subtracting the dither amplitude duty ratio from the reference duty ratio, as indicated by the following formulae (1) and (2).

(increase duty ratio)=(reference duty ratio)+(dither amplitude duty ratio) (1)

(decrease duty ratio)=(reference duty ratio)−(dither amplitude duty ratio) (2)

As is apparent from the formulae (1) and (2), the increase duty ratio and decrease duty ratio can be changed by changing the dither amplitude duty ratio. Therefore, in order to maintain a dither amplitude at a predetermined level, the increase duty ratio and decrease duty ratio are adjusted by changing the dither amplitude duty ratio.

Figure 2:
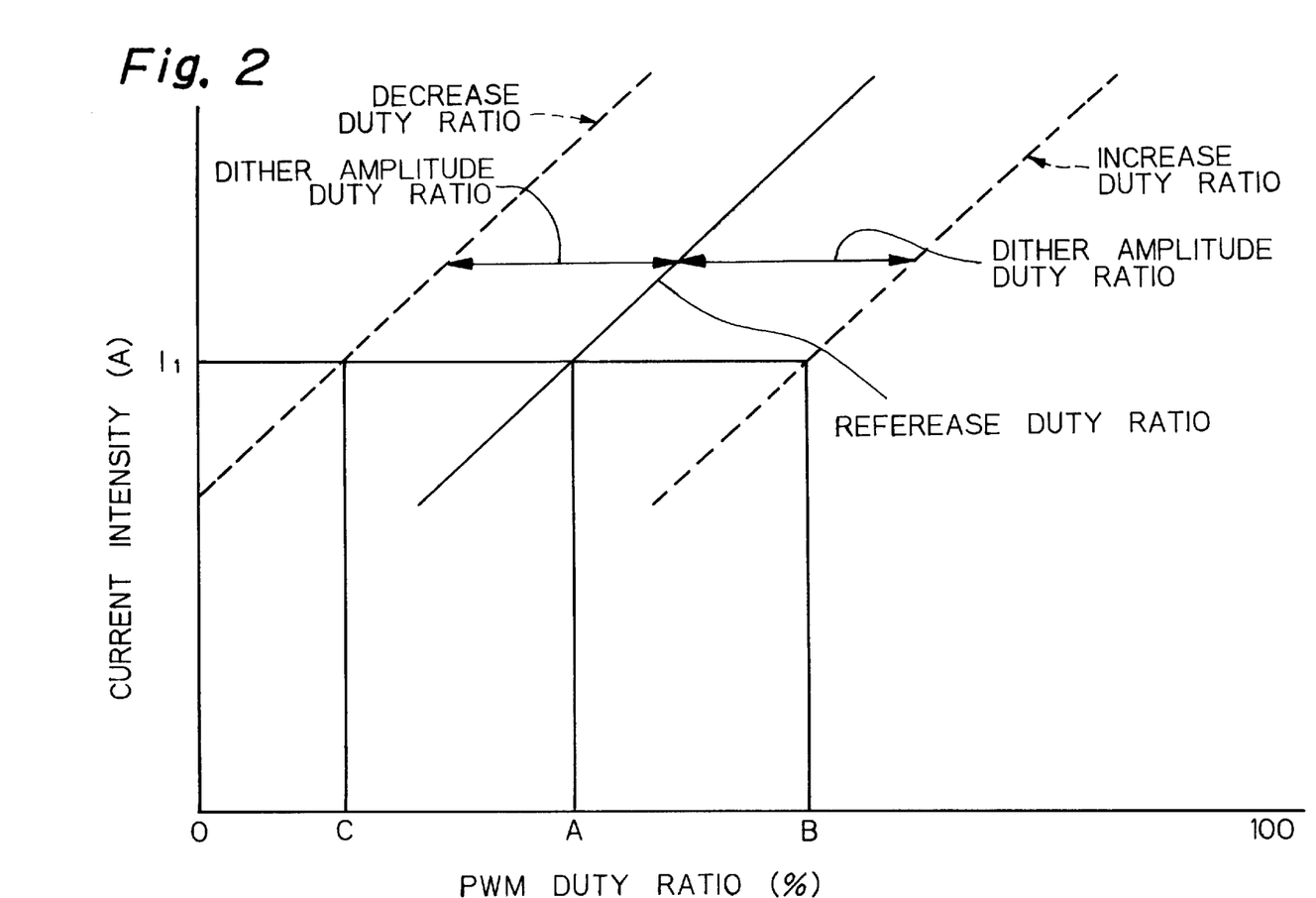
FIG. 2 shows a PWM duty ratio—current intensity map used in the suspension control apparatus of FIG. 1.
Figure 3:
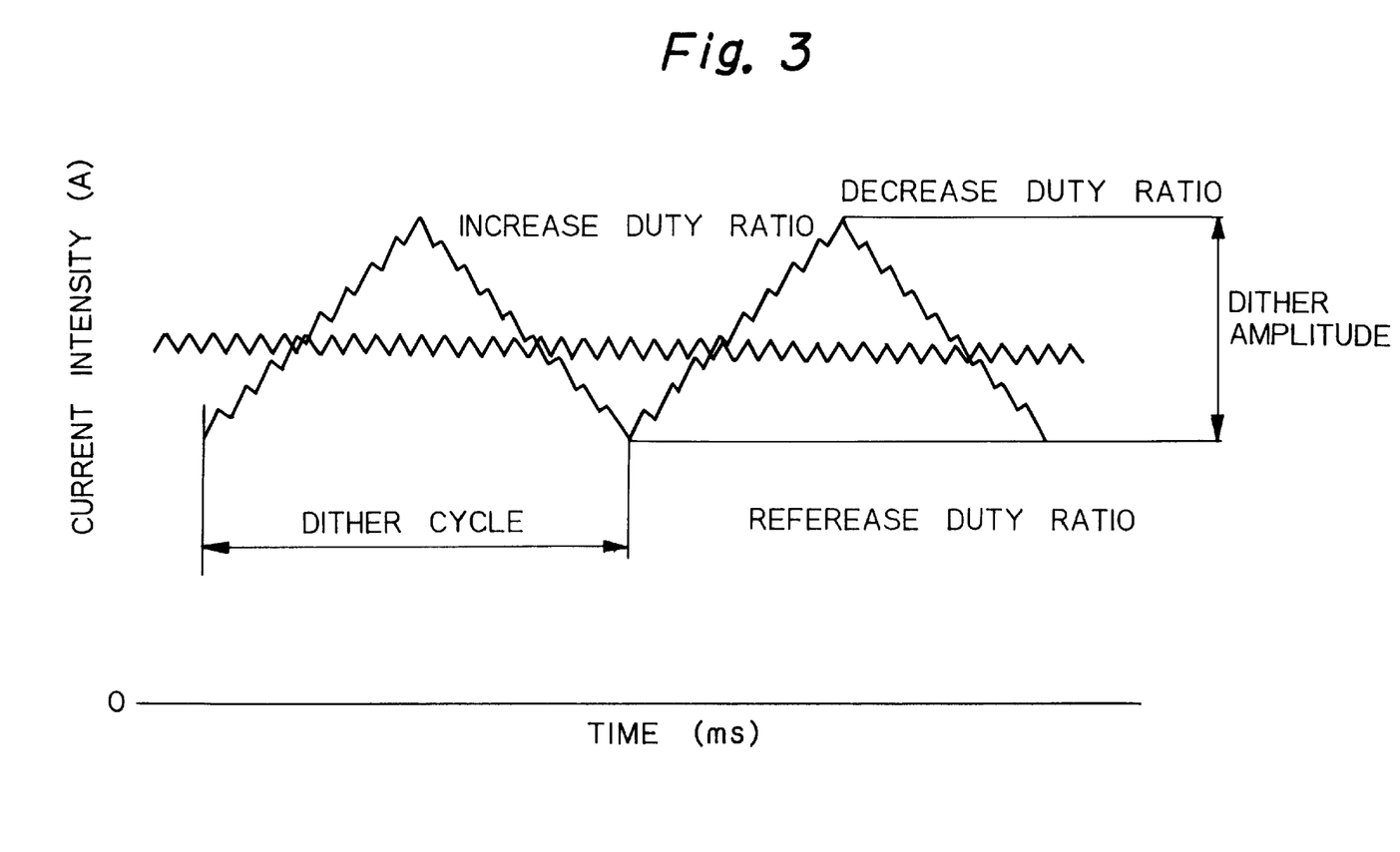
FIG. 3 shows current waveforms for explaining how to determine the PWM duty ratio in the suspension control apparatus of FIG. 1.

For example, when an intensity of a target current (an average intensity of the applied current) is I1, a reference duty ratio A% is determined from the above-mentioned PWM duty ratio—current intensity map of FIG. 2. An increase duty ratio B% is determined by adding a dither amplitude duty ratio to the reference duty ratio A%, and a decrease duty ratio C% is determined by subtracting the dither amplitude duty ratio from the reference duty ratio A%. Subsequently, as shown in FIG. 3, a PWM signal having the increase duty ratio is outputted from the CPU 14 to the transistor 11 during a predetermined period of time (½ of a cycle of a dither) and then, a PWM signal having the decrease duty ratio is outputted from the CPU 14 to the transistor 11 during the same predetermined period of time. Thereafter, the PWM signal having the increase duty ratio and the PWM signal having the decrease duty ratio are alternately outputted to the transistor 11 in the same manner as mentioned above, to thereby obtain a current (to be applied to the solenoid 1) including a dither having a cycle which is twice the above-mentioned predetermined period of time.

The operation of the suspension control apparatus arranged as mentioned above is explained below.

When vibration of the car body is transmitted to the acceleration sensor 6, the acceleration sensor 6 detects the acceleration of the car body in a vertical direction. The detected acceleration value is inputted to the CPU 14 in real time. As indicated in a flow chart of FIG. 4, the CPU 14 conducts calculations for controlling a damping force, to thereby determine a target damping force to be generated by the shock absorber 5 and a target current having an intensity corresponding to the target damping force, based on the detected acceleration value.

Figure 4:
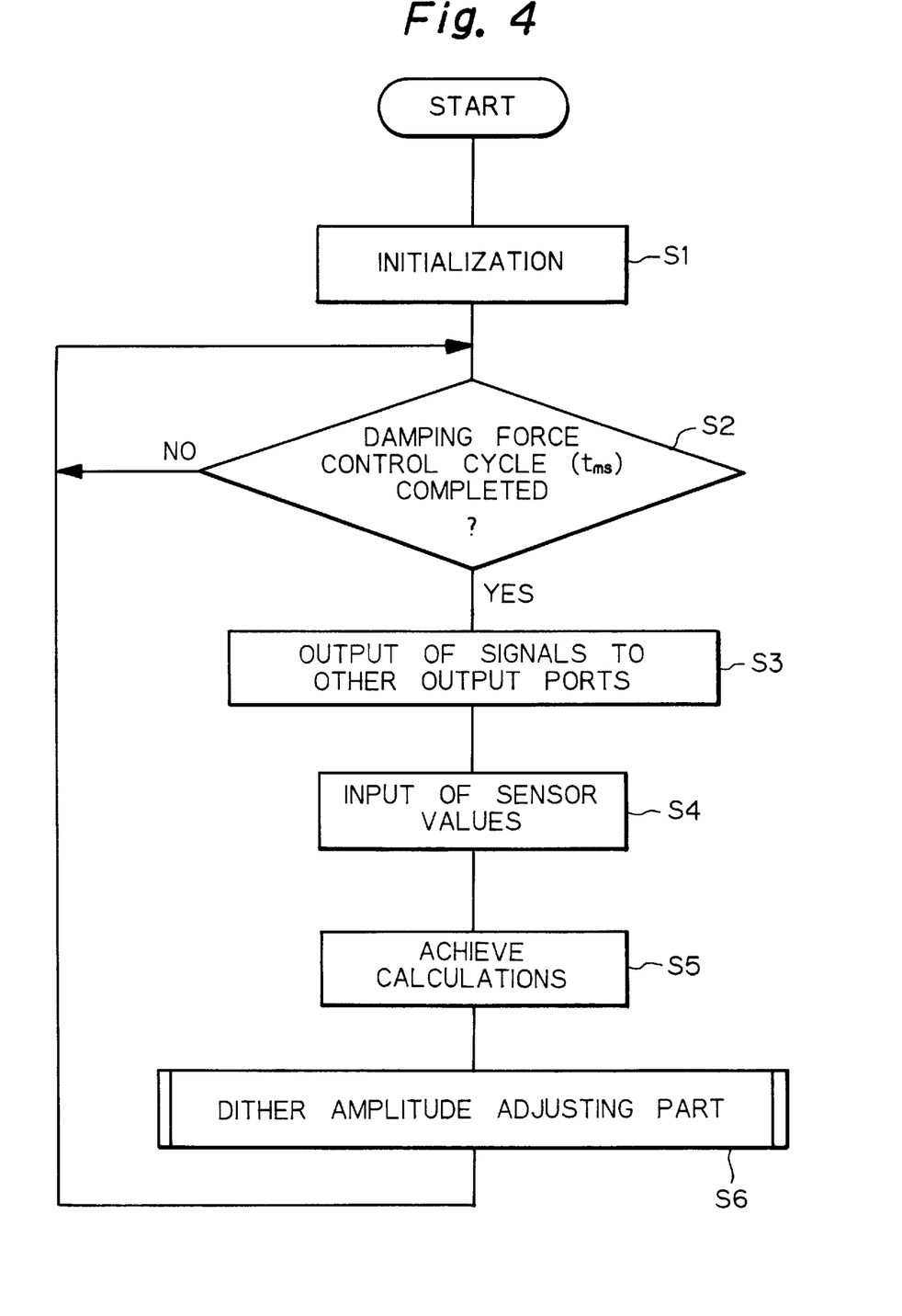
FIG. 4 shows a flow chart showing a main routine in a CPU in the suspension control apparatus of FIG. 1.

Hereinbelow, explanation is made with regard to the flow chart of FIG. 4.

The CPU 14 first effects initialization (step S1), and whether or not a damping force control cycle tms is completed is judged until the damping force control cycle tms is completed (step S2). When the damping force control cycle tms is completed, the CPU 14 applies signals to various parts and portions [such as a LED (light emitting diode)] of the suspension control apparatus other than the solenoid 1 (transistor 11) (step S3).

At a step S4, the acceleration value detected by the acceleration sensor 6 is inputted to the CPU 14, and meanwhile, the CPU 14 detects the voltage $V_0$ provided by the battery 7.

At a step S5, a target damping force required for damping vibration of the car body and a target current having an intensity (equal to an average intensity of the applied current) which is necessary for generating the target damping force are determined, based on the acceleration value inputted to the CPU 14 at the step S4. Further, at the step S5, the PWM signal having a corrected duty ratio which has been obtained at a step S6 at a preceding damping force control cycle is outputted to the transistor 11, thereby operating the proportional solenoid valve (actuator) 4. With respect to the operation of the proportional solenoid valve 4, explanation is made below, with reference to FIG. 6.

In a subroutine at the step S6 subsequent to the above-mentioned step S5, correction of the duty ratio is effected, based on the voltage value $V_0$ detected by the CPU 14, to thereby correct the dither amplitude.

Figure 5:
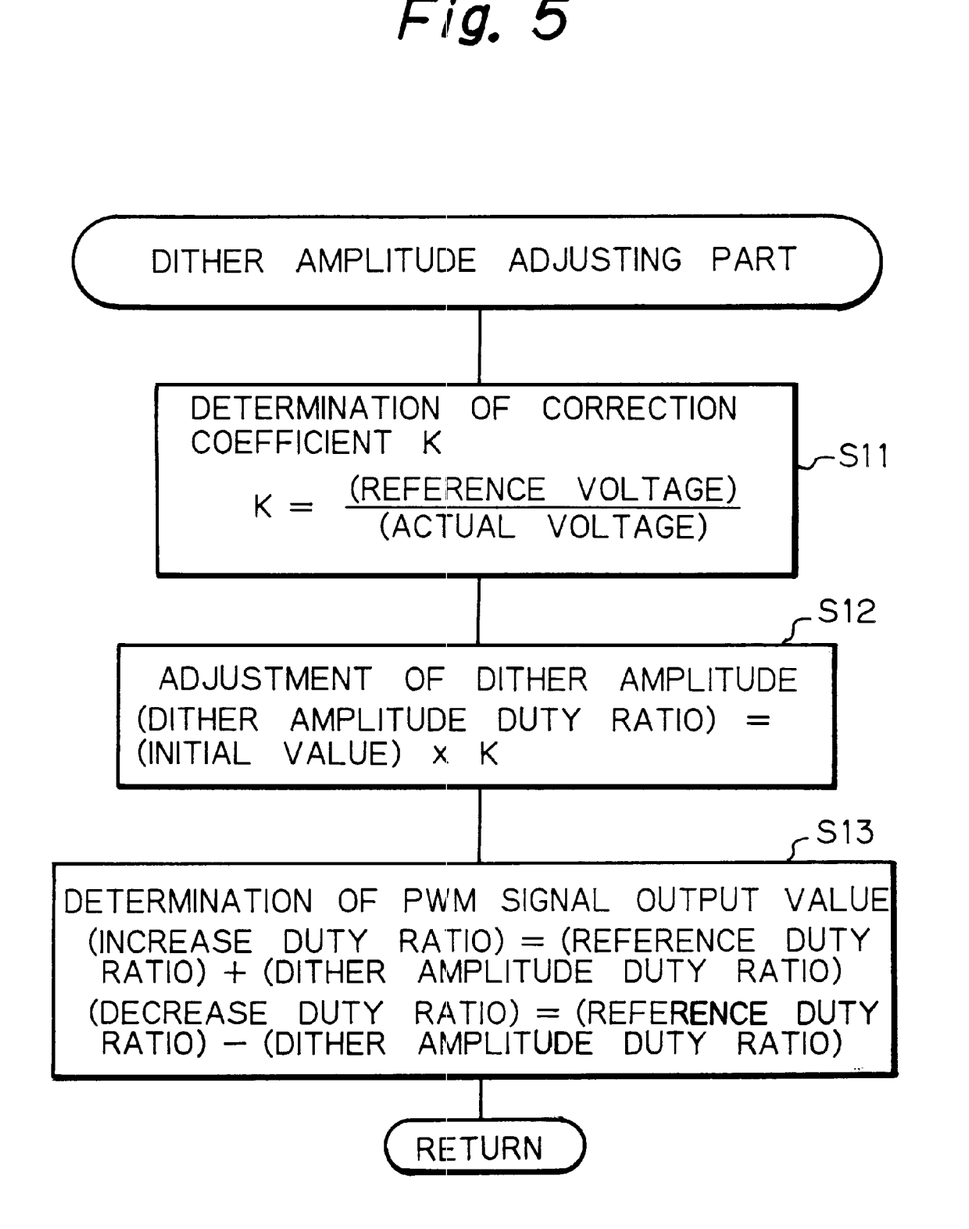
FIG. 5 shows a flow chart showing a subroutine for adjusting a dither amplitude in the main routine of FIG. 4.

A process at the step S6 is explained below, with reference to FIG. 5.

A correction coefficient K is determined from the voltage value $V_0$ detected by the CPU 14 at the step S4, in accordance with the formula K=(reference voltage)/(actual voltage) (step 11).

At a step S12, a prestored value of a dither amplitude duty ratio is multiplied by the correction coefficient K, to thereby obtain a desired dither amplitude duty ratio. An increase duty ratio and a decrease duty ratio are determined from the obtained dither amplitude duty ratio in a manner as mentioned above, in accordance with the PWM duty ratio—current intensity map of FIG. 2 (step S13).

Now, referring to FIG. 6, explanation is made below on a calculation process at the step S5 of FIG. 4 for operating the proportional solenoid valve 4. The proportional solenoid valve 4 is operated by applying to the solenoid 1 a current including a dither which is obtained in a manner as mentioned above, that is, by outputting the PWM signal while switching the PWM duty ratio between the increase duty ratio and the decrease duty ratio at predetermined time intervals (½ of a cycle of a dither). The calculation process shown in FIG. 6 is conducted independently from the flow chart (main routine) of FIG. 4, while interrupting the main routine at predetermined time intervals (½ of a cycle of a dither).

Figure 6:
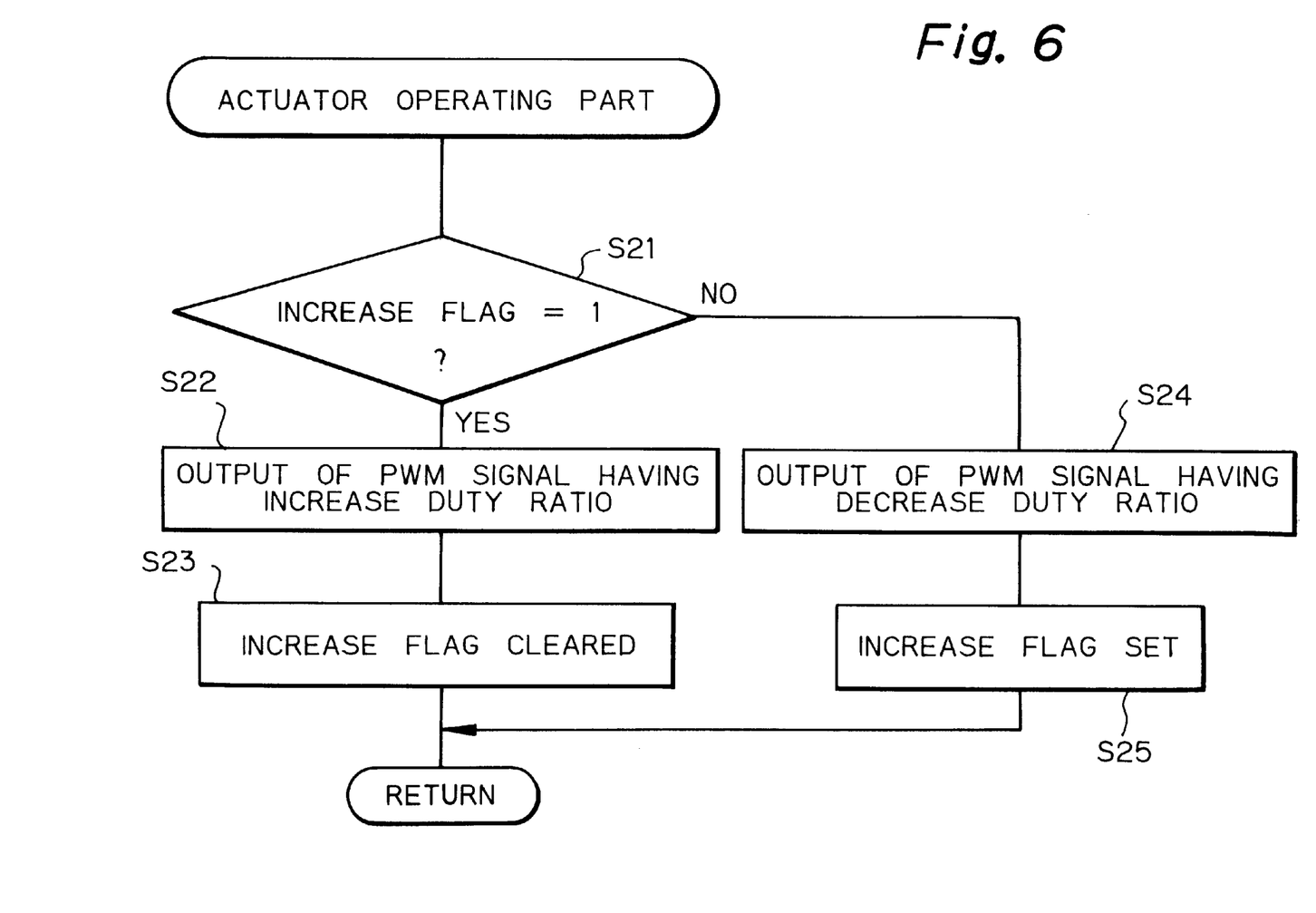
FIG. 6 shows a flow chart showing an example of a calculation process for operating a proportional solenoid valve in the main routine of FIG. 4.

As shown in FIG. 6, it is judged whether or not an increase flag for the increase duty ratio is 1 (step S21). When the increase flag is 1, the PWM signal having the increase duty ratio which has been determined at the step S6 in a preceding damping force control cycle is outputted (step S22), and the increase flag is cleared (step S23). The operation of step S22 is conducted during a period of ½ of a cycle of a dither.

On the other hand, when the increase flag is not 1, the PWM signal having the decrease duty ratio which has been determined at the step S6 in a preceding damping force control cycle is outputted (step 24), and the increase flag is set (step S25). The operation of step S24 is conducted during a period of ½ of a cycle of a dither.

By the process of FIG. 6, a current obtained by superimposing a dither on a target current (having an intensity equal to an average intensity of the applied current) is applied to the solenoid 1, thereby operating the proportional solenoid valve 4. The shock absorber 5 generates a damping force corresponding to the average intensity of the applied current, to thereby damp vibration of the car body.

As mentioned above, by applying to the solenoid 1 a current which is obtained by superimposing a dither on a target current (having an intensity equal to an average intensity of the applied current), a damping force is generated, according to an average intensity of the applied current, that is, according to an acceleration of the car body in a vertical direction which is detected by the acceleration sensor 6, thereby satisfactorily effecting damping of vibration of the car body.

Further, as mentioned above, the voltage $V_0$ provided by the battery 7 is detected by the CPU 14 and the PWM duty ratio is corrected, based on the detected voltage value $V_0$, so as to maintain an amplitude of a dither of the applied current at a predetermined level, so that the dither amplitude can be maintained at a predetermined level, even when the voltage $V_0$ changes. Therefore, even when the voltage $V_0$ becomes high, the dither amplitude does not change, so that no disadvantage arises, such as pronounced noise and vibration of the proportional solenoid valve 4. Further, even when the voltage $V_0$ becomes low, the dither amplitude does not change, so that an undesirable increase in hysteresis with respect to a damping force can be avoided, thereby providing satisfactory responsivity in controlling a damping force.

In the above-mentioned embodiment of the present invention, the voltage $V_0$ provided by the battery 7 is detected. However, in the present invention, a terminal voltage of the solenoid 1 may be detected, instead of the voltage $V_0$ of the battery 7. Further, when an ACG-L [an L terminal of an alternator (a terminal of a charge lamp)] is used as a power source for the solenoid 1, a voltage of the ACG-L may be detected.

Further, in the above-mentioned embodiment of the present invention, a single PWM duty ratio is selected as each of the increase duty ratio and the decrease duty ratio, and the PWM duty ratio is switched between the increase duty ratio and the decrease duty ratio at predetermined time intervals, to thereby obtain a current including a dither having a cycle which is twice the above-mentioned predetermined time interval. However, in the present invention, two or more PWM duty ratios may be employed as each of the increase duty ratio and the decrease duty ratio. For example, the above-mentioned embodiment of the present invention can be changed as follows. Namely, instead of employing a single increase duty ratio, two different PWM duty ratios are employed as the increase duty ratio and the decrease duty ratio, respectively, and the PWM duty ratio is switched between those two different PWM duty ratios at a time interval which is ½ of the predetermined time interval for switching the PWM duty ratio in the above-mentioned embodiment. Further, instead of employing a single decrease duty ratio, two different duty ratios are employed as the increase duty ratio and the decrease duty ratio, respectively, and the PWM duty ratio is switched between those two different duty ratios at a time interval which is ½ of the predetermined time interval for switching the PWM duty ratio in the above-mentioned embodiment. In this case, a current including a dither having a cycle which is four times a time interval for switching the PWM duty ratio is obtained, so that switching of the direction of slight oscillation (i.e., dithering) of the spool of the proportional solenoid valve can be performed very smoothly, to thereby surely prevent the proportional solenoid valve from generating pronounced noise and vibration.

Figure 7:
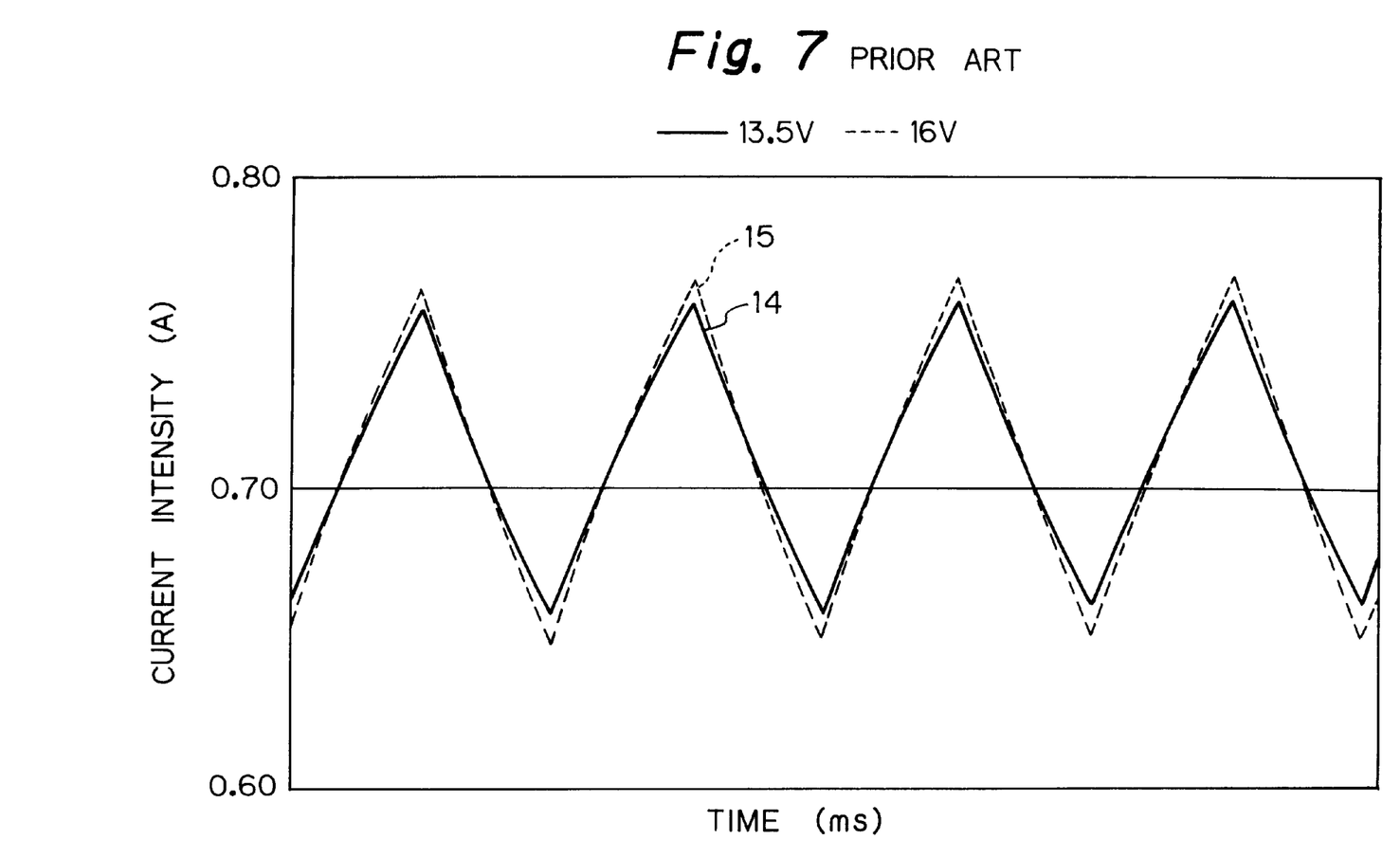
FIG. 7 is a graph showing a dither amplitude when a voltage is changed in a conventional suspension control apparatus.
Figure 8:
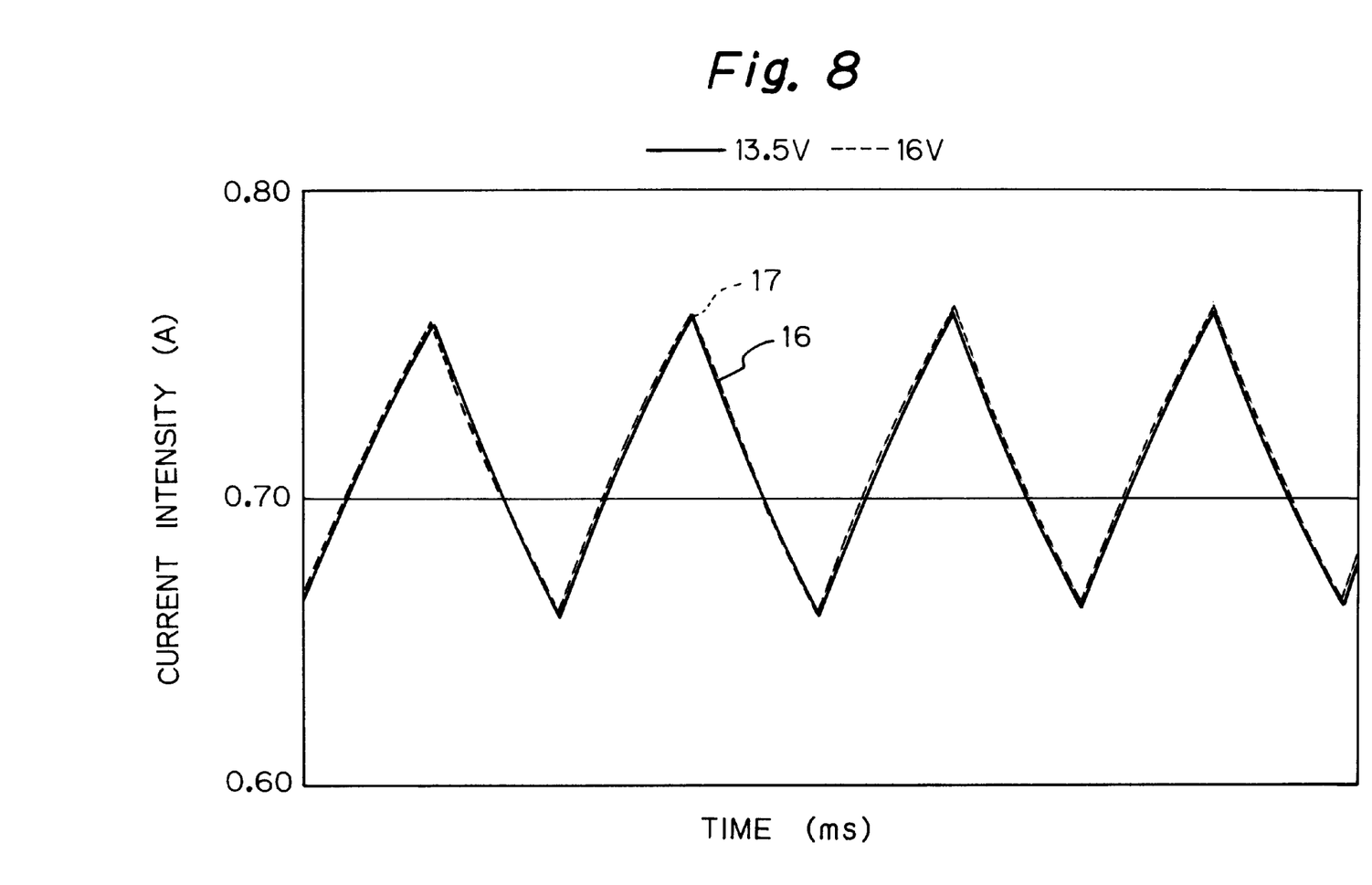
FIG. 8 is a graph showing a dither amplitude when a voltage is changed in a suspension control apparatus of the present invention.

With respect to each of a suspension control apparatus of the present invention which is capable of adjusting the PWM duty ratio and a conventional suspension control apparatus which is not capable of adjusting the PWM duty ratio, measurements of a waveform of the applied current were conducted. Results of the measurements with respect to the conventional suspension control apparatus and the suspension control apparatus of the present invention are shown in the graphs of FIGS. 7 and 8, respectively. From the graphs of FIGS. 7 and 8, it was confirmed that the suspension control apparatus of the present invention is capable of satisfactorily maintaining a dither amplitude at a predetermined level.

Illustratively stated, in the above-mentioned measurements, the conventional suspension control apparatus, which is not capable of adjusting the PWM duty ratio, was operated under conditions such that a voltage of the battery was 13.5 V, an average intensity of the applied current was 0.7 A and a dither amplitude was 0.1 A. Then, the voltage of the battery was changed from 13.5 V to 16 V. In the graph of FIG. 7, a solid line 14 indicates the waveform of the applied current at 13.5 V, and a broken line 15 indicates the waveform of the applied current at 16 V. As is apparent from FIG. 7, the amplitude of a dither of the applied current became undesirably large when the voltage was changed from 13.5 V to 16 V.

On the other hand, the suspension control apparatus of the present invention which is capable of correcting the PWM duty ratio was operated under the same conditions as mentioned above (a voltage of the battery: 13.5 V, an average current intensity: 0.7 A, a dither amplitude: 0.1 A). Then, the voltage of the battery was changed from 13.5 V to 16 V. In the graph of FIG. 8, a solid line 16 indicates the waveform of the applied current at 13.5 V, and a broken line 17 indicates the waveform of the applied current at 16 V. As is apparent from FIG. 8, the amplitude of a dither of the applied current was maintained at a predetermined level, even when the voltage was changed from 13.5 V to 16 V.

In the suspension control apparatus of the present invention which is arranged as mentioned above, a target current (having an intensity equal to an average intensity of the applied current) can be determined, based on an acceleration of a car body in a vertical direction, which is detected by the acceleration sensor, and a current

What is claimed is:

1. A suspension control apparatus for use with a power source and a vehicle having a vehicle body and a vehicle axle, said suspension control apparatus comprising:

PWM signal generating means for generating a PWM signal having a variable duty ratio;

a proportional solenoid valve having a solenoid and a movable member, said solenoid to be connected to the power source through switching means which is operable for switching on and off in response to the PWM signal, said movable member being operable to be displaced according to an intensity of current applied to said solenoid wherein said current applied to said solenoid includes a dither which is obtained by changing the duty ratio of the PWM signal at predetermined time intervals;

a variable damping force generating shock absorber to be provided between the vehicle body and the vehicle axle to generate a damping force which varies depending on a position of said movable member;

voltage detecting means for detecting a voltage impressed on said solenoid; and duty ratio adjusting means for adjusting the duty ratio of the PWM signal, based on a voltage value detected by said voltage detecting means, so as to maintain an amplitude of the dither at a predetermined level.

2. A suspension control apparatus according to claim 1, wherein the duty ratio includes a reference duty ratio and a dither amplitude duty ratio and said duty ratio adjusting means is operable for adjusting the dither amplitude duty ratio by multiplying the dither amplitude duty ratio by K which is determined by the following expression:

$$K=(r.v.)/(a.v.)$$

wherein (r.v.) is a reference value of the voltage of the power source and (a.v.) is a value of voltage actually detected by said voltage detecting means.

3. A suspension control apparatus for use with a power source and a vehicle having a vehicle body and a vehicle axle, said suspension control apparatus comprising:

a PWM signal generator operable to generate a PWM signal having a variable duty ratio;

a proportional solenoid valve including a solenoid, and a movable member operable to displace according to an intensity of current applied to said solenoid, wherein the current applied to said solenoid includes a dither which is obtained by changing the duty ratio of the PWM signal at predetermined time intervals;

a switch connected to said solenoid and to be connected to the power source, operable to switch on and off in response to the PWM signal;

a variable damping force generating shock absorber to be connected to the vehicle body and the vehicle axle, and operable to generate a damping force which varies depending on a position of said movable member;

a voltage detector electrically connected to said solenoid operable to detect a voltage impressed on said solenoid; and a duty ratio adjuster electrically connected to said voltage detector and said PWM signal generator, operable to adjust the duty ratio of the PWM signal, based on a voltage value detected by said voltage detector, so as to maintain an amplitude of the dither at a predetermined level.

4. A suspension control apparatus according to claim 3, wherein:

said PWM signal generator is operable to generate the PWM signal such that the duty ratio includes a reference duty ratio and a dither amplitude duty ratio; and said duty ratio adjuster is operable to adjust the dither amplitude by multiplying the dither amplitude duty ratio by K which is determined by the following expression:

$$K=(r.v.)/(a.v.)$$

wherein (r.v.) is a reference value and (a.v.) is a value of voltage actually detected by said voltage detector.

* * * * *